United States Patent [19]
Laidlaw et al.

[11] Patent Number: 4,722,456
[45] Date of Patent: Feb. 2, 1988

[54] WITH ACCELEROMETER FOR DETECTING EXTRANEOUS DISTURBANCES WEIGH FEEDER

[75] Inventors: John Laidlaw, Oakland; Ronald J. Ricciardi, Woodcliff Lake, both of N.J.; Stephen D. Kahn, Brooklyn, N.Y.

[73] Assignee: Acrison, Inc., Moonachie, N.J.

[21] Appl. No.: 889,471

[22] Filed: Jul. 25, 1986

[51] Int. Cl.$^4$ ............................................. G01G 13/24
[52] U.S. Cl. ........................................ 222/58; 222/77; 177/185
[58] Field of Search ............... 222/55, 58, 1, 77, 52; 177/185; 73/D10; 340/669, 666, 665, 613; 198/505; 364/479

[56]  References Cited
U.S. PATENT DOCUMENTS

| Re. 30,967 | 6/1982 | Ferrara et al. | 222/58 |
| Re. 32,101 | 4/1986 | Ricciardi et al. | 222/58 X |
| Re. 32,102 | 4/1986 | Ricciardi et al. | 222/58 X |
| 3,889,848 | 6/1975 | Ricciardi et al. | 222/58 |
| 4,449,597 | 5/1984 | Ricciardi et al. | 177/256 |
| 4,553,618 | 11/1985 | Kusmenskji | 177/185 |
| 4,553,619 | 11/1985 | Fujinaga | 177/185 |

Primary Examiner—H. Grant Skaggs
Assistant Examiner—Nils E. Pedersen
Attorney, Agent, or Firm—Davis Hoxie Faithfull & Hapgood

[57] ABSTRACT

The present invention is a loss-in-weight feeding system including an accelerometer for detecting extraneous disturbances impinging on the system and preventing the disturbance from adversely affecting the feed rate. A split-beam weighing assembly senses the weight of the material in the container and produces a first signal to control the feed rate. The accelerometer is mounted on the split beam assembly and produces an acceleration signal. The acceleration signal is compared with a predetermined limit, and if the comparison shows a difference beyond a predetermined size, the action of the first signal is inhibited.

4 Claims, 3 Drawing Figures

WITH ACCELEROMETER FOR DETECTING EXTRANEOUS DISTURBANCES WEIGH FEEDER

The present invention is a loss-in-weight weigh feeding system including novel means for detecting extraneous disturbances impinging on such systems and preventing them from adversely affecting the feed rate. The present invention is an alternative system for accomplishing the result achieved by inventions disclosed in several patents assigned to the assignee of the present invention, for example and without limitation, U.S. Reissue Pat. Nos. 30,967, 32,101 and 32,102.

BACKGROUND OF THE INVENTION

Metering of Materials

Precise metering or feeding of solids and liquids is a task encountered in a myriad of industrial processes. Wherever material is continuously fed from a supply vessel of some sort into a production line, whether the product being manufactured is a pharmaceutical, an explosive, a food, a plastic, etc., the rate at which material is supplied must be controlled. A number of different types of continuous metering systems have been known for many years. Fundamentally, these are of two types: volumetric feeding systems and gravimetric feeding systems.

Volumetric Feeding Systems

A volumetric system, as the name implies, is one that dispenses material by volume. Volumetric systems employ a displacement mechanism of some sort operating at a set speed (for example, an auger or a pump mounted below a supply vessel and rotating at a fixed number of revolutions per minute) which dispenses a fixed volume of material per revolution. Volumetric feeding systems do not monitor the actual feed rate or compare it to the desired feed rate and do not have any feedback system to correct for whatever difference might exist between those two values. If the density of the material being fed remains constant and if the material never sticks to the critical components, always moves freely and does not exhibit any other flow or handling problems, a volumetric feeder can provide reasonable accuracy. However, if actual conditions are not close to these idealized conditions, volumetric feeders can not be relied upon to produce good results. Also, since volumetric feeding systems do not detect feed rate, they are not suitable in situations where, for some reason, operational feed rate data is required.

Gravimetric Feeding Systems

Where a high degree of accuracy is required, a system using some form of feedback control is required. Systems which monitor their own feeding performance and automatically correct for variations from the desired performance are called gravimetric or weigh feeding systems. Gravimetric systems control the feeding of material by weight, thereby compensating for changes of density and poor product flow characteristics (e.g., stickiness, clumping, etc.). For this reason, they can provide much higher accuracy than volumetric feeders. Gravimetric feeding systems are of three general types: weigh-belt; weigh-auger; and loss-in-weight.

Typical weigh-belt and weigh-auger gravimetric feeding systems measure the weight flowing across a belt or through an auger during operation, that is, while it is feeding material, and compare that weight to an expected or "set" weight, using the difference between the two to generate a control signal. While such systems offer good accuracy for many uses, material sometimes accumulates on the belt, auger or other critical components of the weighing mechanism and thereby "fools" the control system into decreasing the feed rate improperly. As will be appreciated, the problem is even worse if this accumulation builds up and falls off the belt intermittently. In short, this type of gravimetric system, while using feedback principles to offer some control, has substantial limitations that can seriously impair the accuracy-producing capabilities of the device.

The other type of gravimetric feeding system is the loss-in-weight system. A loss-in-weight system is a weigh feeding system in which the gradual decrease in weight of the system caused by the constant release of material from its supply vessel is monitored and compared to an expected decrease in weight to assess performance. Unlike the weigh-belt and weigh-auger gravimetric systems, loss-in-weight systems are not affected by material adhering to the hopper or feed auger, since the entire system is weighed continuously. In loss-in-weight systems, a control system continually (or with great frequency) monitors a signal indicating the decreasing weight of the feed supply vessel and associated feed mechanism and adjusts the feed rate to maintain an even rate of weight loss over time. For example, if a loss-in-weight system is intended to feed 60 pounds of material per hour, it should lose weight at a rate of 1 pound per minute or 7.56 grams per second. If a weight loss amount over a given time period is larger than expected as sensed by the control system, it commands the feeding mechanism to slow down. Similarly, if the weight detected becomes too high, indicating that the weight loss has been less than expected, the control system orders an increase in the material flow rate to cause the system to "catch up" with the expected feed.

Moreover, because it is often critical that loss-in-weight weigh feeding systems deliver material accurately over short time periods, not just when the feed rate is averaged over long periods of time, virtually continuous accuracy is essential. If 1 pound per minute is desired, it is not satisfactory to deliver no material for 59 seconds and then a slug of material weighing 1 pound in the final second.

Extraneous Disturbances

While the ability of loss-in-weight systems to deliver a wide variety of solid and liquid materials accurately under ideal conditions had long been appreciated, their inability to cope with extraneous disturbances greatly restricted their utility before the inventions disclosed in the patents identified above were made.

In factory installations, physical forces of various types impinge on the feeding system. For example, workers accidentally bump the feeder, prop ladders against it and drop tools on it; wind blowing through an open factory door gusts against it; vehicles rolling down adjacent aisles cause it to vibrate and the operation of surrounding equipment cause it to vibrate. Because loss-in-weight systems constantly monitor weight, and because all of these disturbances of the feeder appear to alter weight, the control systems in older loss-in-weight devices attempted to compensate the feed rate in response to such disturbances. These abrupt, extraneous disturbances, however, are not true indications of weight changes, and those systems operated erratically when they attempted to use the scale or weight signal including such disturbances to control the feed rate.

For example, if a tool was dropped onto the storage vessel of an older loss-in-weight feeder, the feeder suddenly detected an increase in weight instead of a steady decrease in weight as would be caused by normal operation. The system tried to overcome the perceived problem by feeding out more material to get the weight of the system back down to the programmed level. Of course, since the disturbance actually did not reflect an improper feed rate, the "correction" called for by the control system actually drove the feed rate far off the proper value.

The havoc caused by disturbances of this type, unpredictable in timing but certain to occur in real-world installations, can readily be imagined. The control problem caused by extraneous disturbances was recognized prior to the making of the inventions disclosed in, for example, Reissue U.S. Pat. Nos. 30,967, 32,101 and 32,102, but the prior solutions were not effective. Generally they were of three forms:

(1) physical shielding—metal plates and guards—to isolate the feeder from impacts; or, mounting the feeder on rubber isolators;

(2) slow acting control systems designed to be so sluggish that they did not "see" sharp disturbances; and (3) educational efforts directed at plant personnel, to impress them with the need to avoid disturbing the machine.

While these procedures lessened the control problem caused by such disturbances, they did not recognize the nature of the problem nor did they cure it, and their continuing inability to cope effectively with such disturbances kept loss-in-weight systems from having any commercial significance for many years.

The few loss-in-weight systems that were used prior to the inventions identified above included a type of flow rate monitor generally referred to in the industry as a deviation alarm. Such alarms, as disclosed for example in the 1951 Harkenrider U.S. Pat. No. 2,544,155 or the 1969 Marhauer U.S. Pat. No. 3,481,509, do not detect abrupt disturbances when they occur and sometimes do not detect even their aftermaths. A deviation alarm instead watches for long-term deviations in the flow rate (such as might be caused by the supply of material in the supply vessel running out). Such an alarm notifies the operator only after a flow rate deviation has occurred and, consequently, after material has been delivered at an improper rate, often with serious effects to the process.

The "ACRILOK" Solution

Employees of the assignee of the present invention first developed a solution to the problem of extraneous disturbances in or around 1973. That solution is sometimes referred to as the ACRILOK technique. According to that technique, extraneous disturbances are detected by their effect on the weight signal, and that effect is used to trigger a mechanism for holding the feed rate at a value independent of the disturbance. The ACRILOK technique relies on the weight signal, the same signal which had long been used in loss-in-weight systems to control the feed rate; however, it uses that weight signal in a way never before used, to solve a longstanding problem never before solved, despite its importance.

Reissue U.S. Pat. No. 30,967 discloses an analog circuit for monitoring the weight signal to detect an extraneous disturbance before it causes the discharge rate of the feeder to be distorted (that is, before the feed rate has been adjusted in a misplaced attempt to correct for the disturbance to the weight signal) and for locking the feed rate at a value independent of the disturbance until the disturbance has subsided. This timely detection and locking is accomplished, according to that patent, by monitoring the signal of weight versus time and locking the feed rate when an acceleration of that signal having a value greater than some predetermined threshold value is detected. Reissue U.S. Pat. Nos. 32,101 and 32,102, as well as other patents assigned to the assignee of the present invention and themselves identified in the patents already mentioned, disclose other analog and digital loss-in-weight weigh feeding systems which use various particular means for detecting accelerations of the weight signal and preventing extraneous disturbances from adversely affecting performance or the accuracy of the feed rate output.

SUMMARY OF THE INVENTION

The present invention is a loss-in-weight weigh feeding system in which, contrary to the systems disclosed in, for example, Reissue U.S. Pat. Nos. 30,967, 32,101 and 32,102, the weight signal is not monitored to detect extraneous disturbances. Instead, according to the present invention, a separate means is used to detect an acceleration of the system indicating an extraneous disturbance and initiate a locking or other planned control of the feed rate. The present invention may be employed instead of the systems disclosed in the patents identified above which are assigned to the assignee of the present invention whenever, for some reason, use of the weight signal is not feasible or desirable. The present invention detects extraneous disturbances without monitoring the weight signal.

In the preferred embodiment of the present invention, an accelerometer is mounted on the loss-in-weight scale in an orientation suitable for detecting a vertical acceleration of the weighing system in either an upward or downward direction. In other embodiments, where the weighing system does not move vertically, the accelerometer would be mounted so that it detected an abnormal acceleration of that system in whatever direction it sensed weight changes. When such an acceleration occurs, the accelerometer output changes rapidly in response, and that output change can be detected and used to trigger a locking or other special control of the feed rate.

DETAILED DESCRIPTION

Figure 1:
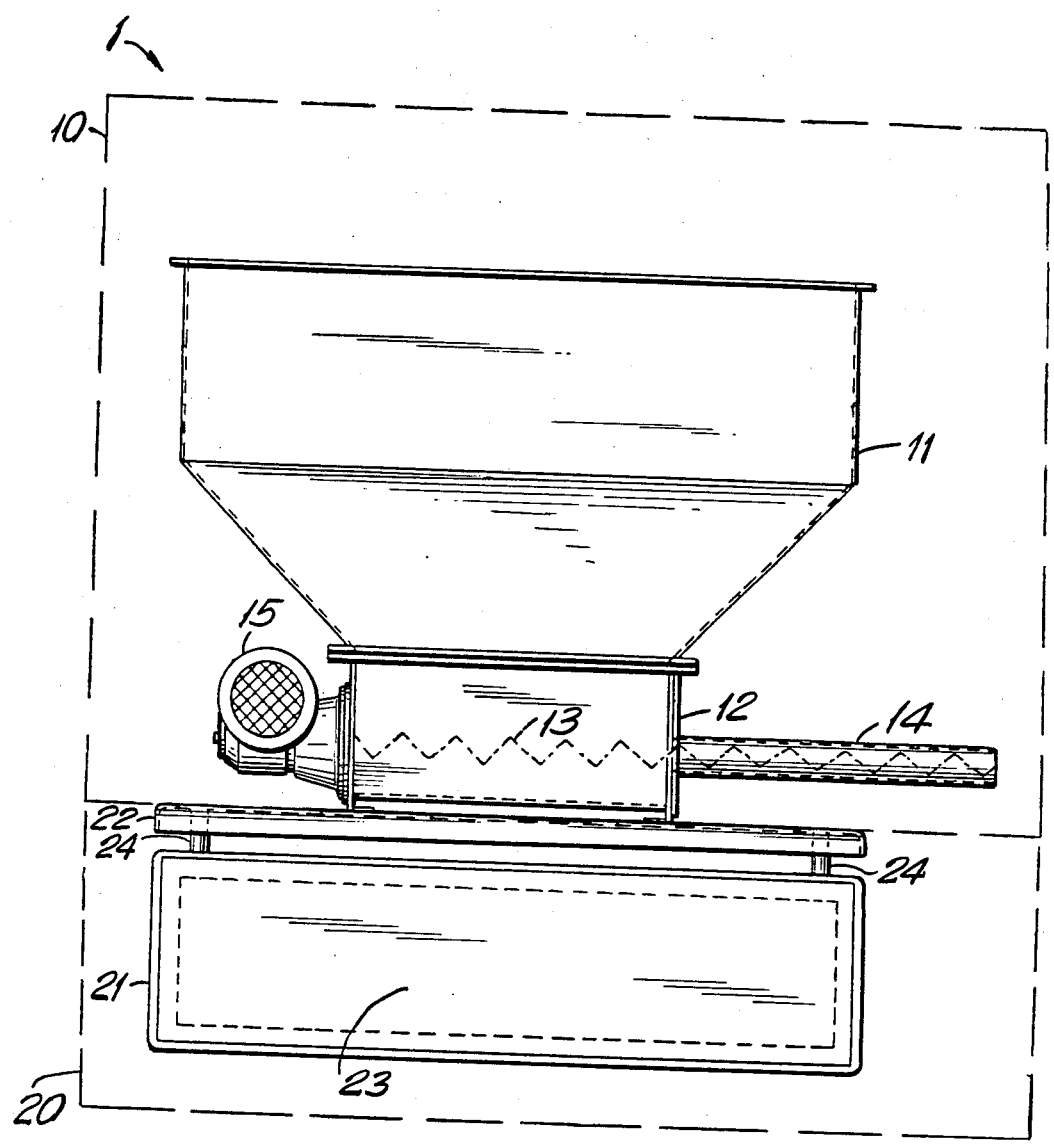
FIG. 1 shows in schematic form a loss-in-weight weigh feeding system according to the present invention.

FIG. 1 shows schematically a loss-in-weight weigh feeding system including an auger type feed mechanism 10 mounted on a flexure weighing system 20 like that disclosed in U.S. Pat. No. 4,449,597. Feed mechanism 10 includes a dry solids hopper 11 which leads into a feed chamber 12 connected beneath it, and discharge cylinder 14 connected to the feed chamber 12 and containing within it a feed auger 13 which is driven by motor 15. Material to be metered in a controlled fashion is placed in hopper 11. Under the influence of gravity or gravity assisted by mechanical agitation, the material flows into the feed chamber 12. When motor 15 is operating, auger 13 rotates so that material is pushed from feed chamber 12 through and then out the end of the discharge cylinder 14. As indicated, the hopper and feeding mechanism are all mounted through mounting studs 24 on a weight sensing device or scale 20, here a split-beam type flexure-based system.

As is disclosed in U.S. Pat. No. 4,449,597, when motor 15 is activated, material is metered out the end of discharge cylinder 14 causing the total weight of the contents of the feed mechanism 10 to decrease. Weight sensing system 20 monitors the total weight placed on the system and produces an electrical signal indicative of that weight. As is disclosed in several patents already mentioned in this specification, both patents assigned to the present assignee and patents to third parties, that signal may be compared to a set point signal and used to generate a control signal to guide the feeder back from any deviation from the desired feed rate.

Figure 2:
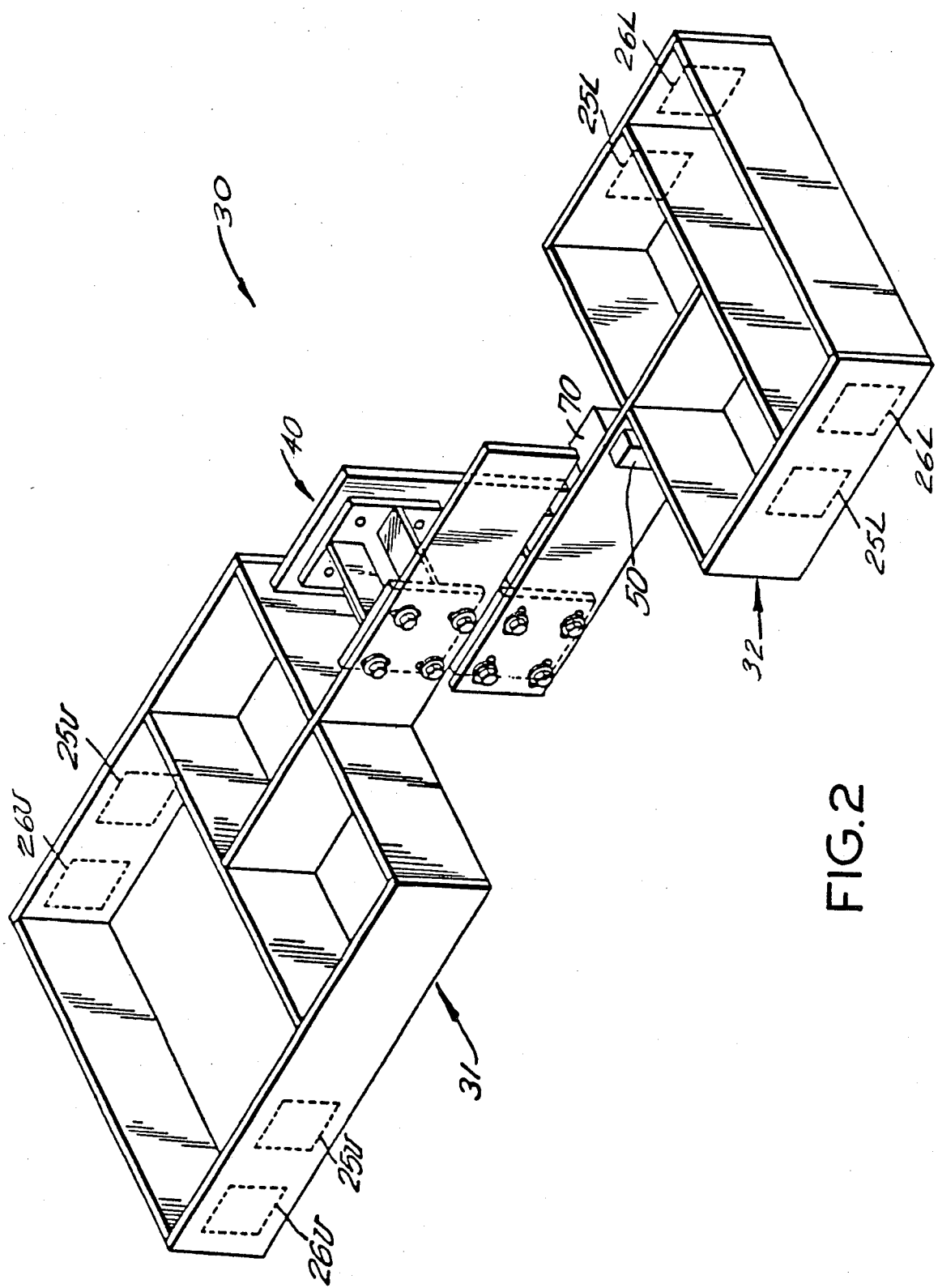
FIG. 2 is a schematic perspective view of the split-beam weighing system in the preferred embodiment of the present invention, illustrating the position of the accelerometer with respect to the two beams.

In the current embodiment, the weighing device 20 is a so-called split beam type flexure scale system such as the system disclosed in U.S. Pat. No. 4,449,597, which disclosure is herein incorporated by reference. As can be seen in FIG. 2, adapted from FIG. 3 of that patent, the weighing mechanism 20 includes a balance assembly 30 comprised of upper and lower beams 31 and 32 which are joined by a flexure linkage assembly 40. Upper beam 31 is connected to the frame of the device by flexures shown schematically at 25U, which act as fulcrums, and lower beam 32 is similarly connected to the frame by flexures shown schematically at 25L, which also act as fulcrums. The weight on the scale is transmitted to the beams by studs 24 shown in FIG. 1 which are connected to beam 31 through flexures shown at 26U and to beam 32 through flexures shown at 26L. The interconnected ends of the load-bearing beams 31 and 32 in the flexure weighing system rise as weight is applied to the system and fall when weight is removed as is described in detail in that patent and the rise and fall of beam 31 is detected by weight sensor 70 as also described in that patent. If an accelerometer 50 is mounted on beam 31 as shown, it will sense any vertical acceleration of that beam caused by an extraneous disturbance.

While the ACRILOK technique as disclosed, for example and without limitation, in Reissue U.S. Pat. Nos. 30,967, 32,101 and 32,102, operates to detect extraneous disturbances and to prevent them from disrupting the feed rate output of loss-in-weight systems, it does so by monitoring the weight signal. When use of the weight signal for such purposes may not be feasible or desirable for any reason, a loss-in-weight system would be unprotected against such disturbances. The present invention provides an alternative in such circumstances.

According to the present invention, accelerometer 50 is mounted on the scale in an orientation suitable for detecting a vertical acceleration of the system in either an upward or downward direction. The output signal from the accelerometer 50 is then monitored for deviation beyond limits expected in normal, undisturbed operation by detector/controller 60 which can operate in either analog or digital fashion. When such a deviation occurs, indicating an abnormal acceleration of the system either upward or downward, detector/controller 60 triggers a locking of the speed of motor 15 and hence, a locking of the feed rate output.

The invention may be utilized on other weighing devices than the split beam type of flexure scale system. For example, it could be used in conjunction with the flexure system disclosed in U.S. Pat. No. 4,042,051 in which the weight sensor is a deflection sensing device attached near one end of a beam remote from the supply vessel.

Several conditions must be satisfied for optimum use of this method of detecting extraneous disturbances with any scale system. Most accelerometers are linear devices, that is, they detect accelerations along a particular axis. It is important that the accelerometer be chosen and mounted so that components of extraneous disturbances acting along the same axis as the weight sensing device are effectively detected, since it is those components of such disturbances which affect the perceived weight. While, in the present embodiment, the accelerometer is mounted so that it detects extraneous disturbances along a vertical axis—the axis of the weight sensing device employed in this embodiment—other axes might be employed. It is also important that the accelerometer be biased against gravity or otherwise adjusted so that it will detect accelerations whether they tend to move the system up or down, since disturbances can be of either type. Finally, performance is improved if the accelerometer is mounted on the weight sensing device sufficiently remote from the main fulcrum so that it senses a relatively large acceleration from any given disturbance but not so distant that the movement of the device at the mounting point becomes arcuate in shape, since, with some types of weighing system, that will interfere with operation of the accelerometer. In the embodiment shown in FIG. 2, accelerometer 50 is mounted on the upper beam 31 close to the position of the weight sensor 70.

While numerous commercially-available accelerometers may be satisfactory for the purpose disclosed, the present embodiment uses a Schaevitz LSB Linear accelerometer having a range of $\pm 1.0$ g, a nominal natural frequency of 100 Hz, and a nominal output impedance of 5 kilohms, all as measured at 20 degrees Centigrade. As noted above, it has a 1-g bias so that it will sense either an upward or a downward force as is necessary with the particular weighing system discussed. The full-range open circuit output voltage of this device is $\pm 5.0$ volts DC giving a range of 10 volts. In the present embodiment, the threshold level has been found most satisfactory when set at $\pm 2.5\%$ of the full range voltage; in other words, the system is adjusted so that an output voltage swing of less than $\pm 0.25$ volts from the normal level does not lock the feed rate.

Figure 3:
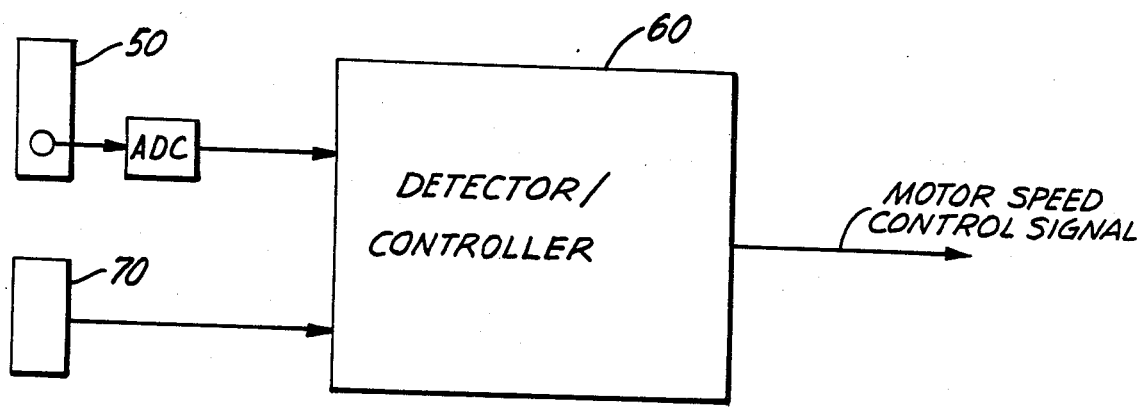
FIG. 3 is a flow chart showing how the accelerometer is used to monitor the system for extraneous disturbances and lock the feed rate when such a disturbance is detected.

The functioning of the detector/controller 60 in the present system is illustrated in FIG. 3. As is shown there, the output from accelerometer 50 is first converted to digital form in an analog-to-digital convertor (ADC). Then, the resulting digital signal is compared against the preset $\pm$limits. If the signal is within the threshold limits, the system permits normal feedback control of the feed rate to continue. If, however, the signal is outside the limits, the motor updating is stopped and consequently the feed rate is locked. This locked condition persists until a comparison of the accelerometer signal with the preset limits shows that the acceleration has decreased beneath the threshold, at which point a settling timer contained within detector/controller 60 is started. When the timer reaches its predetermined limit, assuming that the accelerometer signal has remained in the meantime within the preset limits, motor updates are again begun and gravimetric feed rate control recommences. If the accelerometer output rises above the preset limit during the timer's action, the timer is reset to zero until the acceleration again decreases beneath the threshold value.

While a single accelerometer mounted so that it detects accelerations in a vertical direction, parallel to the direction of the force of gravity, functions as described herein, it is also within the scope of the present invention to use more than one accelerometer or a single mechanism which can sense accelerations along more than one direction. For example, an array of three orthogonally mounted accelerometers, with their output signals suitable combined, could be installed on a system to detect accelerations in any direction including a direction indicating an extraneous disturbance affecting the weight signal relied upon for control purposes.

In addition, while devices commonly referred to as accelerometers are described herein, that term as used in the specification and specifically the claims herein is also intended to encompass other means—not connected to the weight sensing means—for detecting accelerations. As one example, a laser beam associated with the weigh feeding system could be aimed at one or more reflecting surfaces separate from the system, and the reflected light could be monitored to detect accelerations of the system without departing from the scope of the present invention.

Finally, while the present embodiment locks the feed rate at a fixed value during the disturbance, other forms of alternative, predetermined control are obviously possible within the spirit and scope of the invention.

We claim:

1. A weigh feeding system comprising:
   (a) a container for holding a quantity of a substance to be fed;
   (b) means for discharging the substance from the container at a controllable feed rate;
   (c) means for sensing the weight of at least the substance in the container and for producing a first signal responsive to the weight;
   (d) means for generating a control signal in response to the first signal;
   (e) means for controlling the discharging means in response to the control signal to thereby maintain the feed of the substance from the container at a desired feed rate;
   (f) acceleration detection means for producing an acceleration signal separate from the first signal in response to an acceleration of at least the weight sensing means;
   (g) means for comparing the acceleration signal with a predetermined limit; and
   (h) means for inhibiting the action of the control signal on the control means when the comparison shows a difference beyond a predetermined size.

2. A weigh feeding system according to claim 1 wherein the acceleration detection means comprises at least one accelerometer mounted on the weight sensing means in an orientation such that it senses accelerations in the same direction in which the weight sensing means senses weight.

3. A weigh feeding system according to claim 1 wherein the acceleration detection means consists essentially of one accelerometer mounted on the weight sensing means in an orientation such that it senses accelerations in the same direction in which the weight sensing means senses weight.

4. A weigh feeding system according to claim 3 wherein the weight sensing means is a split-beam assembly having interconnected beams connected to a frame by flexure linkages, and wherein the accelerometer is mounted on one of the beams remote from the flexure linkages.

* * * * *

UNITED STATES PATENT AND TRADEMARK OFFICE
CERTIFICATE OF CORRECTION

PATENT NO. : 4,722,456

DATED : February 2, 1988

INVENTOR(S) : John Laidlaw et al.

It is certified that error appears in the above-identified patent and that said Letters Patent is hereby corrected as shown below:

On the title page, the title should read --FEEDER WITH ACCELEROMETER FOR DETECTING EXTRANEOUS DISTURBANCES--

Signed and Sealed this

Tenth Day of July, 1990

*Attest:*

HARRY F. MANBECK, JR.

*Attesting Officer*        *Commissioner of Patents and Trademarks*